(12) United States Patent
Binnard et al.

(10) Patent No.: US 6,313,550 B1
(45) Date of Patent: Nov. 6, 2001

(54) COIL MOUNTING AND COOLING SYSTEM FOR AN ELECTRIC MOTOR

(75) Inventors: Mike Binnard, Belmont; Andrew J. Hazelton, San Carlos, both of CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 09/496,839

(22) Filed: Feb. 2, 2000

(51) Int. Cl.[7] ............................... H02K 41/00; H02K 9/19
(52) U.S. Cl. ........................................................... 310/12
(58) Field of Search ................................. 310/12, 42, 194, 310/98, 60 A; 336/208

(56) References Cited

U.S. PATENT DOCUMENTS

| | | | |
|---|---|---|---|
| 3,855,485 | 12/1974 | Matsui et al. | 310/13 |
| 4,625,132 | 11/1986 | Chitayat | 310/13 |
| 5,138,206 | 8/1992 | Schmidt | 310/12 |
| 5,777,403 | 7/1998 | Yuan | 310/12 |
| 5,783,877 | 7/1998 | Chitayat | 310/12 |
| 6,084,319 * | 7/2000 | Kamata et al. | 310/12 |

FOREIGN PATENT DOCUMENTS 6-62786   9/1994   (JP).

\* cited by examiner

*Primary Examiner*—Nestor Ramirez
*Assistant Examiner*—Judson H. Jones
(74) *Attorney, Agent, or Firm*—Jim Rose; Steven G. Roeder

(57) ABSTRACT

A coil assembly (14) used with a magnet assembly (12) for a linear or planar electric motor (10) is provided herein. The coil assembly (14) includes a plurality of coils (18) attached to a coil base (16) with a plurality of coil supports (22). The coil supports (22) secure the coils (18) to the coil base (16) with the coils (18) spaced apart from a first surface (23) of the coil base (16). As a result thereof, both sides (32), (34) of each coil (18) are exposed for cooling. Further, the coil supports (22) allow the coils (18) to expand laterally with minimal stress and thermal deformation. The coil assembly (14) can also include a plurality of spaced apart covers (62). Each cover (62) fits over one of the coils (18) and is secured to the coil base (16). A fluid (24) can be directed into a fluid passageway (58) around each coil (18) to cool each coil (18).

32 Claims, 8 Drawing Sheets

COIL MOUNTING AND COOLING SYSTEM FOR AN ELECTRIC MOTOR

FIELD OF THE INVENTION

The present invention relates generally to electric motors that are particularly useful with a lithographic device for the fabrication of integrated circuits on semiconductor wafers. More specifically, the present invention relates to a system for mounting and cooling a plurality of spaced apart coils for linear or planar electric motors.

BACKGROUND

Linear and planar electric motors are used in a variety of devices and systems. For example, linear and planar electric motors are used to precisely position a semiconductor wafer during photolithography and other semiconductor processing. The accurate positioning of the wafer during processing is critical to creating high density semiconductor wafers. Alternately, linear or planar motors are used in other devices, including elevators, electric razors, machine tools, metal cutting machines, inspection machines and disk drives.

A linear electric motor generally has a one-dimensional magnet assembly and a one-dimensional coil assembly positioned along the magnet assembly. A planar electric motor generally has a two-dimensional magnet assembly and a two-dimensional coil assembly positioned near the magnet assembly. Electric current in the coil assembly creates a force between the coil assembly and the magnet assembly that can be used to move one of the assemblies relative to the other assembly.

The coil assembly for a linear or planar motor typically includes a coil base having a generally planar, upper surface and a plurality of spaced apart, coils directly secured to the upper surface of the coil base with an adhesive. Mounting the coils directly to the coil base provides a good mechanical connection between the coils and the coil base. This enhances motor controllability and reduces vibration.

Unfortunately, existing linear or planar electric motors are not entirely satisfactory. In particular, electrical current in the coils produces heat due to resistance in the coils. The coils have limited thermal conductivity. During operation, the coils are at a higher temperature than the surrounding environment. Thus, during operation, heat from the coils is transferred to the surrounding environment, including the air surrounding the electric motor and the other components positioned near the electric motor. The heat changes the index of refraction of the surrounding air. This reduces the accuracy of an interferometer system used to monitor the position of the motor and degrades machine positioning accuracy.

As a result thereof, in some applications, including photolithography, it is necessary to accurately control the temperature of the external surfaces of the motor. With the coils glued directly to the coil base, heat from the coils is transferred directly to the upper surface of the coil base and the parts attached to the coil base. Thus, cooling must be provided to both the coil and the side of the coil base that is opposite the coils in order to control the temperature of the external surfaces of the motor.

Additionally, the direct attachment of the coils to the upper surface of the coil base can create a thermal distortion of the coil assembly. In particular, the coils typically are made of a material having a higher coefficient of thermal expansion than the coil base. Further, during operation, the coils are at a higher temperature than the coil base. As a result thereof, the coils expand relative to the coil base. The differential in expansion creates thermal stress in the coils and the coil base and can cause the coil assembly to bend and flex. This reduces the accuracy of movement of the motor.

In light of the above, it is an object of the present invention to provide a device and method for mounting coils in an electric motor that provides a rigid mechanical connection between the coils and the rest of the motor and good thermal isolation of the coils from the rest of the motor. Yet another object of the present invention is to provide a device and method for mounting coils in an electric motor that allows the coils to expand and minimizes thermal distortion. It is another object of the present invention to provide a cooling system to maintain the external surfaces of the motor at a set temperature.

SUMMARY

The present invention is directed to a coil assembly for a linear or planar motor that satisfies these needs. The coil assembly includes a plurality of coils and a coil base having a plurality of coil supports for securing the coils to the coil base. Uniquely, each coil support extends away from a first surface of the coil base and maintains one of the coils spaced apart from the first surface of the coil base. With this design, the coil supports allow for direct cooling on both sides of each coil. Additionally, because the coils are spaced apart from the first surface of the coil base, heat transfer to the first surface of the coil base can be minimized.

Preferably, each coil support extends between an inner perimeter of one of the coils and the first surface of coil base. Because each coil is retained by its inner perimeter, each coil is allowed to expand laterally with minimal stress and minimal thermal deformation.

The coil assembly can also include a plurality of spaced apart, individual covers that are secured to the coil base. Each cover encircles a portion of one of the coils and one of the coil supports. Each cover is sized and shaped to provide a fluid passageway between each coil and each cover. Alternately, for example, a single cover can be used to encircle a plurality of coils.

The present invention can also include a fluid source providing a cooling fluid to the fluid passageways to cool the coils. The location of an inlet and an outlet to each fluid passageway can be varied. For example, one or more inlets and/or one or more outlets could extend through the coil base into each fluid passageway.

The present invention is also a method for manufacturing a coil assembly for a linear motor. The method includes providing a plurality of coils, and securing the coils to the coil base with each coil spaced apart from the first surface of the coil base. The method can also include the step of directing a fluid around the sides of each coil to cool each coil.

Additionally, the present invention is directed to a method for making an exposure apparatus that forms an image from a first object onto a second object, and a method for making a device utilizing the exposure apparatus.

Importantly, the coil supports provide a simple and rigid way to individually secure the coils to the coil base. Further, the coil supports thermally isolate the coils from the first surface of the coil base and provide space around both sides of each coil for directing a fluid. With the design, it is easier to maintain external surfaces of the electric motor at a set temperature. Further, the coil supports allow the coils to expand laterally with minimal stress.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
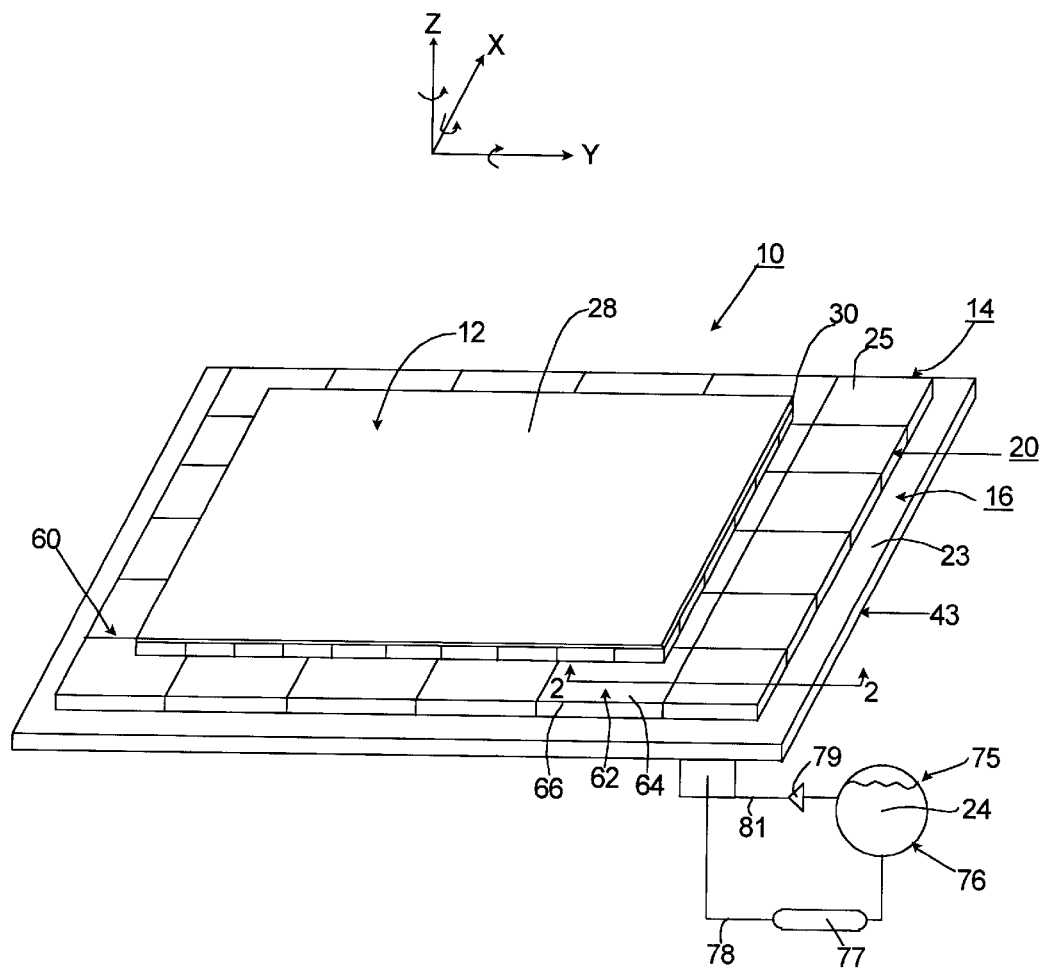
FIG. 1A is a perspective view of an electric motor including a coil assembly and magnet assembly having features of the present invention.
Figure 2:
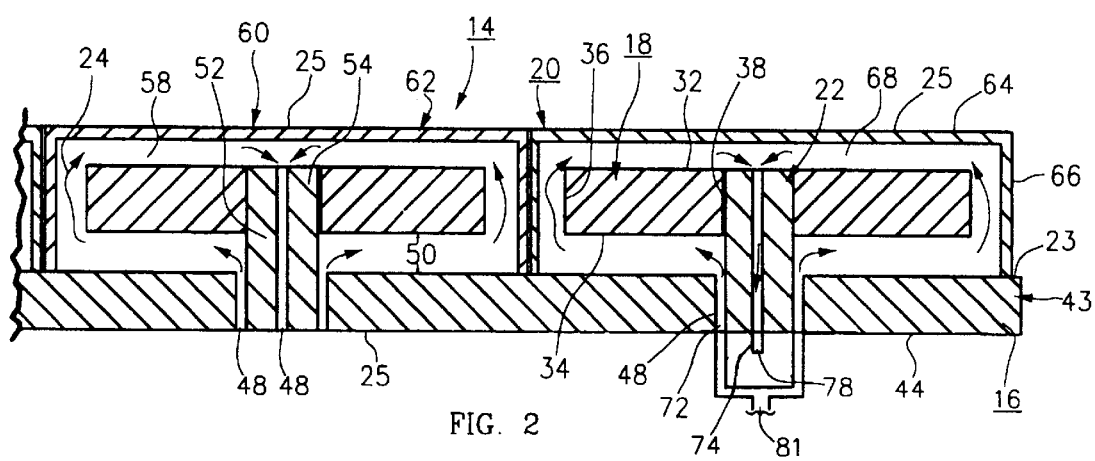
FIG. 2 is an enlarged, cut-away view of the coil assembly taken on line 2—2 of FIG. 1A.

FIG. 1A illustrates a portion of an electric motor 10 having features of the present invention. The electric motor 10 includes a magnet assembly 12 positioned near a coil assembly 14. Referring to FIGS. 1A and 2, the coil assembly 14 includes a coil base 16, a plurality of spaced apart coils 18, a cover assembly 20, and a plurality of spaced apart coil supports 22. Uniquely, the coil supports 22 maintain the coils 18 spaced apart from a first surface 23 of the coil base 16. This allows for the flow of a fluid 24 (illustrated as arrows in FIG. 2) around each coil 18 to maintain a constant temperature of an external surface 25 of the coil assembly 14. Further, the coil supports 22 provide thermal isolation of the coils 18 from the first surface 23 of the coil base 16 and the environment surrounding the motor 10. Additionally, the coil supports 22 allow the coils 18 to expand laterally with minimal stress. This minimizes thermal deformation of the coil assembly 14.

The motor 10 illustrated in FIG. 1A is commonly referred to as a planar electric motor. The magnet assembly 12 can be maintained above the coil assembly 14 with vacuum preload type air bearings 26 (illustrated in FIG. 9). With this design, the magnet assembly 12 is movable relative to the coil assembly 14 in three degrees of freedom. The coordinate system used for this discussion is also provided in FIG. 1A. In particular, the magnet assembly 12 is movable relative to the coil assembly 14 along the X axis, the Y axis, and rotatable around the Z axis. Alternately, the magnet assembly 12 could be supported above the coil assembly 14 by other ways, such as guides or by the magnetic levitation forces and/or the motor 10 could be designed to be movable with six degrees of freedom.

The size and shape of the coil assembly 14 and the magnet assembly 12 and the components of the coil assembly 14 and the magnet assembly 12 can be varied to suit the design requirements of the electric motor 10. For example, where the magnet assembly 12 is controlled to move in three degrees of freedom relative to the coil assembly 14, preferably a maximum of twenty-five coils 18 are energized at a time. Where the magnet assembly 12 is controlled to move in six degrees of freedom relative to the coil assembly 14, preferably a maximum of twenty-five coils 18 are energized at a time.

Figure 3:
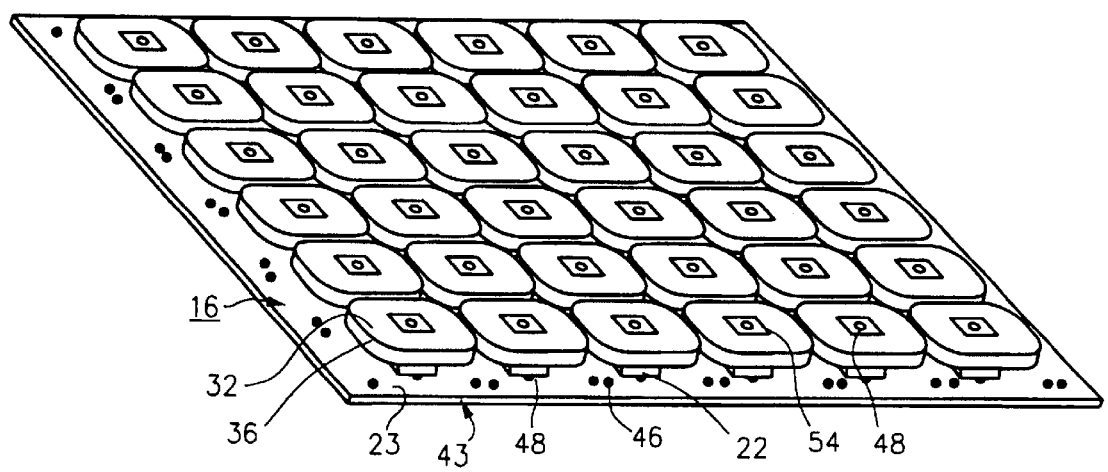
FIG. 3 is a perspective view of a portion of a coil assembly having features of the present invention.

The coil assembly 14 illustrated in FIGS. 1A and 3 is six coils 18 wide by six coils 18 deep and includes a total of thirty-six coils 18. The magnet assembly 12 illustrated in FIG. 1A includes a planar magnet plate 28 and a plurality of magnets 30 secured to the magnet plate 28. In this embodiment, the magnet assembly 12 is sized so that an equivalent of approximately sixteen coils 18, four wide by four deep, are within the magnetic field of the magnet assembly 12. Thus, when the magnet assembly 12 is positioned near the coil assembly 14, an equivalent of approximately sixteen coils 18 can interact with the magnetic field of the magnet assembly 12.

Figure 1B:
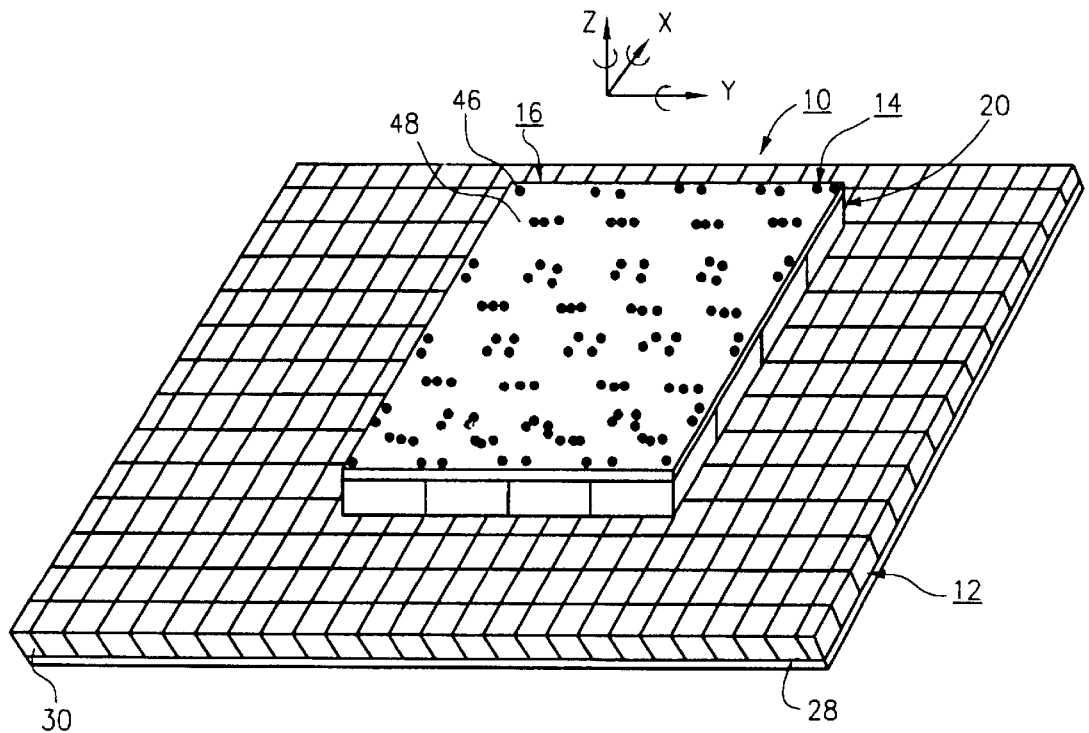
FIG. 1B is a perspective view of another embodiment of an electric motor having features of the present invention.

In an alternate embodiment illustrated in FIG. 1B, the coil assembly 14 is designed to move relative to the magnet assembly 12. In this embodiment, the coil assembly 14 is four coils 18 wide by four coils 18 deep and includes a total of sixteen coils 18 (the coils 18 are not illustrated in FIG. 1B).

Figure 4:
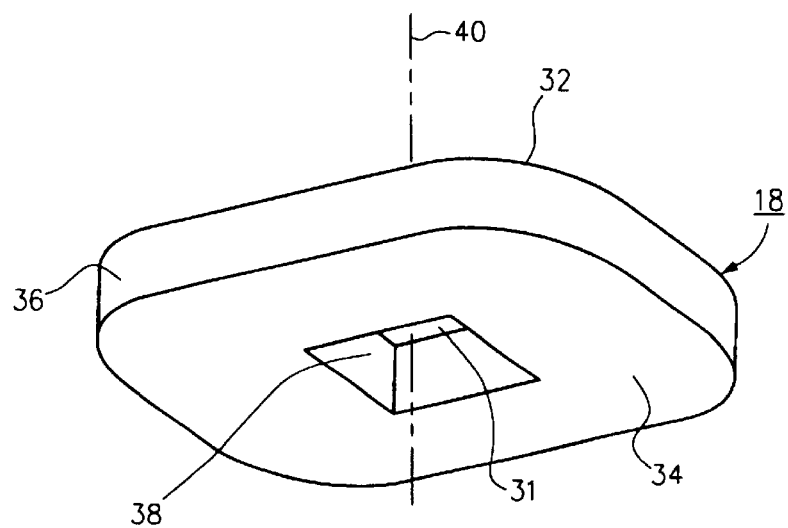
FIG. 4 is a bottom perspective view of a coil having features of the present invention.

Referring to FIGS. 2 and 3, the coils 18 are positioned in a spaced apart arrangement relative to the coil base 16. The spacing and positioning of the coils 18 relative to the coil base 16 can be varied to suit the design requirements of the motor 10. Further, the design of each coil 18 can also be varied to suit the design requirements of the motor 10. FIG. 4 illustrates a perspective view of a suitable, individual, coil 18. Specifically, the coil 18 illustrated in FIG. 4 is flat, rectangular tube shaped and includes a central coil opening 31. The coil 18 also includes a first side 32, an opposed second side 34, an outer perimeter 36 and an inner perimeter 38. As illustrated in FIGS. 2 and 3, the coils 18 are arranged so that the first side 32 of each coil 18 is approximately on the same plane. Each coil 18 also includes a centrally located, coil axis 40. Typically, each coil 18 is made of conventional insulated wire bonded together in an epoxy.

Electrical current through the coils 18 causes the coils 18 to interact with the magnetic field of the magnet assembly 12. This generates a force between the magnet assembly 12 and coil assembly 14 which can be used to control, move, and position one of the assemblies 12, 14 relative to the other one of the assemblies 12, 14. Preferably, for the embodiments in which the magnet assembly 12 moves relative to the coil assembly 14, the coils 18 can be individually controlled and switched electrically with a controller 42 (illustrated in FIG. 9) so that only coils 18 wholly and/or partially covered by the magnet assembly 12 are energized. In other words, only coils 18 that are in a position to interact with the magnetic field of the magnet assembly 12 are energized. The current level for each coil 18 is controlled and adjusted by the controller to achieve the desired resultant forces. Not applying current to the coils 18 outside of the magnetic field of the magnet assembly 12 minimizes heat created by the coil assembly 14.

The coil base 16 is rigid and supports the plurality of spaced apart coils 18 with the coil supports 22. The coil base 16 illustrated in FIGS. 2, 3, 5, 6, and 8 includes a base body 43 and the plurality of coil supports 22. The base body 43 is rectangular, plate shaped and includes the first surface 23 that is planar shaped and an opposed second surface 44 that is also planar shaped. The plurality of coil supports 22 extending away from the first surface 23 of the base body 43. In the embodiment illustrated herein, the base body 43 and the coil supports 22 are formed as a single, unitary structure. Alternately, each coil support 22 could be formed separately and attached to the base body 43 by suitable means. Depending upon the design of the motor 10, the coil base 16 can be made of a low or non-electrically conductive, non-magnetic material, such as low electrical conductivity stainless steel or titanium, or non-electrically conductive plastic or ceramic or a magnetic material such as iron or nickel-iron.

The coil base 16 also includes a plurality of spaced apart cover apertures 46 and a plurality of spaced apart fluid apertures 48 which extend through the coil base 16. Each cover aperture 46 is sized and shaped to receive a cover fastener 49 (illustrated in FIG. 7) therethrough for securing the cover assembly 20 to the coil base 16. Each cover aperture 46 illustrated has a circular cross-section. Each fluid aperture 48 is sized and shaped to allow for the flow of fluid 24 through the coil base 16 to each of the coils 18. Each fluid aperture 48 illustrated in the Figures has a circular cross-section. As can best be seen with reference to FIGS. 2 and 5, three fluid apertures 48 are used to provide the fluid 24 (not shown in FIG. 5) each coil 18. In particular, for each coil 18, two of the fluid apertures 48 are positioned adjacent to one of the coil supports 22 while one of the fluid apertures 48 extends through the coil support 22 along a support central axis 51. As can best be seen with reference to FIG. 2, this arrangement allows the fluid 24 to flow around each individual coil 18 to cool each coil 18. Further, this arrangement allows for the flow of fluid 24 around and through each coil support 22 to cool each coil support 22.

Each coil support 22 rigidly secures one of the coils 18 to the base body 43. Importantly, each coil support 22 maintains one of the coils 18 spaced apart from the first surface 23 of the coil base 16. This allows for flow of the fluid 24 around each side 32, 34 of each coil 18. Further, each coil support 22 retains one of the coils 18 near the coil axis 40 of the coil 18. More specifically, each coil support 22 retains one of the coils 18 by the inner perimeter 38. This allows each coil 18 to expand laterally relative to the coil axis 40 and the first surface 23 with minimal stress on the base body 43 as the temperature of each coil 18 rises. It should be noted that the only thermal stresses created by this arrangement are horizontal tension in each coil support 22 and the corresponding compressive stress in each coil 18.

In the embodiments provided herein, each coil support 22 extends and cantilevers away from the first surface 23 of the coil base 16. Each coil support 22 maintains one coil 18 spaced apart a coil gap 50 from the first surface 23 of the coil base 16. The size of the coil gap 50 can be varied. Typically, a coil gap 50 of between approximately 1 mm and 4 mm allows for a relatively rigid connection of the coil 18 to the base body 43 and isolates the coil 18 from the first surface 23 of the coil base 16. Further, this allows the second side 34 of each coil 18 to be exposed for cooling.

Figure 5:
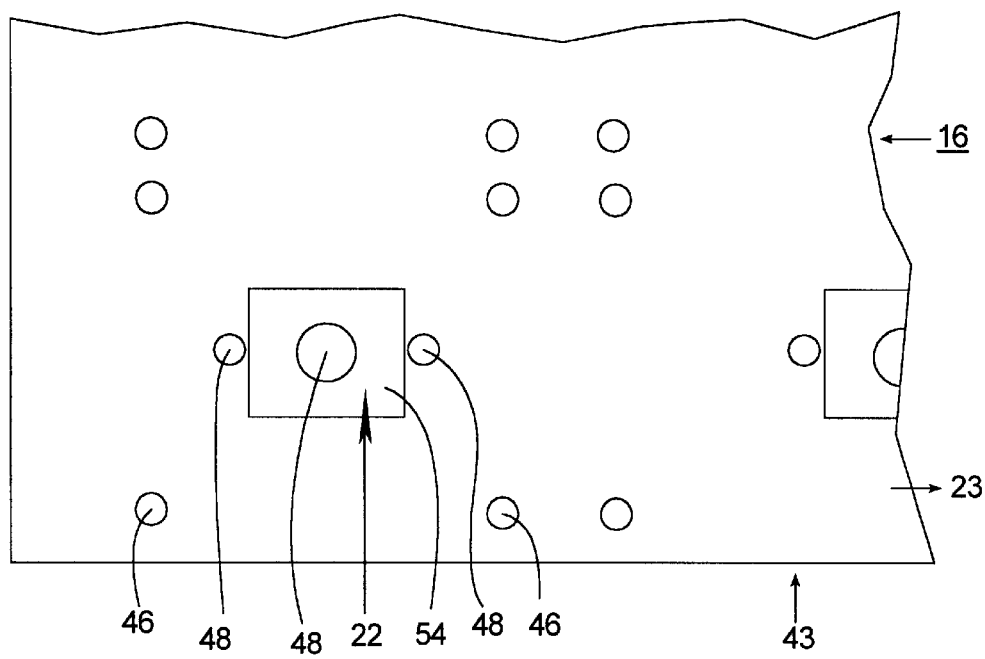
FIG. 5 is a top plan view of a portion of a coil base having features of the present invention.
Figure 6:
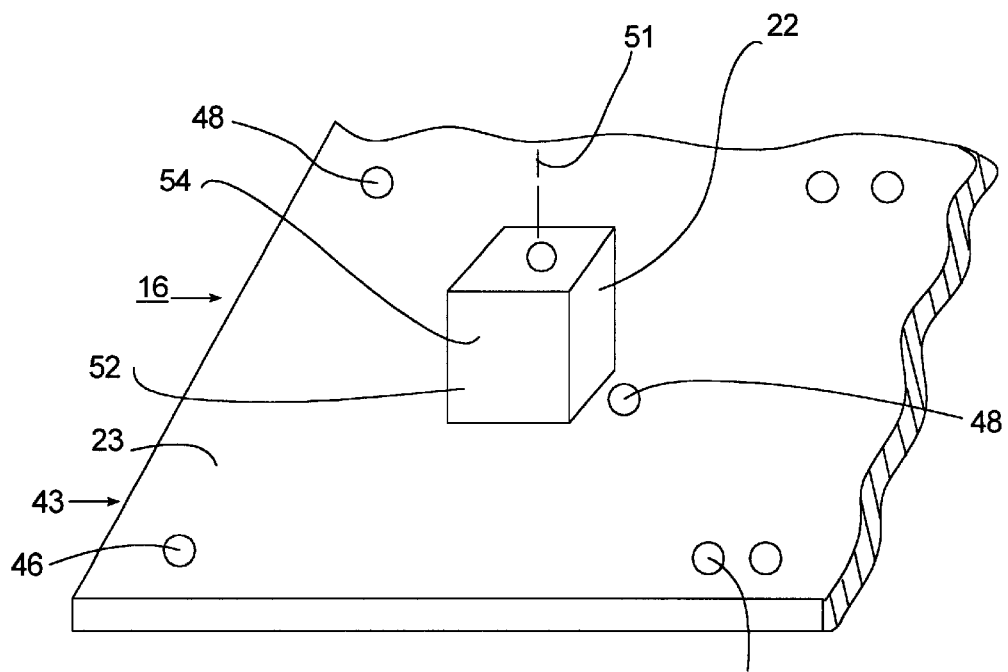
FIG. 6 is a perspective view of a portion of a coil base having features of the present invention.

Each coil support 22 has a thick cross-section so that electromagnetic forces on the coils 18 are transmitted to the base body 43 without excessive deformation of the coil supports 22. Referring to FIGS. 2, 5, and 6 each coil support 22 is rectangular shaped. Each coil support 22 includes a support proximal section 52 and a support distal section 54. The proximal section 52 is secured to the base body 43. The support distal section 54 fits into the coil opening 31 and secures the inner perimeter 38 of one of the coils 18 to the coil base 16. An adhesive (not shown) can be used to secure the inner perimeter 38 of each coil 18 to each support distal section 54. Alternately, for example, each coil support 22 could be interference fitted into one of the coils 18, or a mechanical clamp (not shown) could be used.

The cover assembly 20 encircles the coils 18 and the coil supports 22 and provides a portion of a fluid passageway 58 for cooling each individual coil 18. Further, the cover assembly 20 provides support to the coil base 16, inhibits bending and flexing of the coil base 16, and provides a smooth, flat, planar, surface 60 for interaction with the air bearing 26.

In the embodiments illustrated herein, the cover assembly 20 includes a plurality of covers 62. Alternately, a single cover (not shown) could be used to encircle more than one coil 18 and more than one coil supports 22. FIG. 2 illustrates a cross-sectional view of the coil base 16, the coil supports 22, the covers 62, and the coils 18. Each cover 62 is placed over and encircles a single individual coil 18 and one of the coil supports 22. With this design, each cover 62 provides for an individual fluid passageway 58 around one coil 18.

Figure 7:
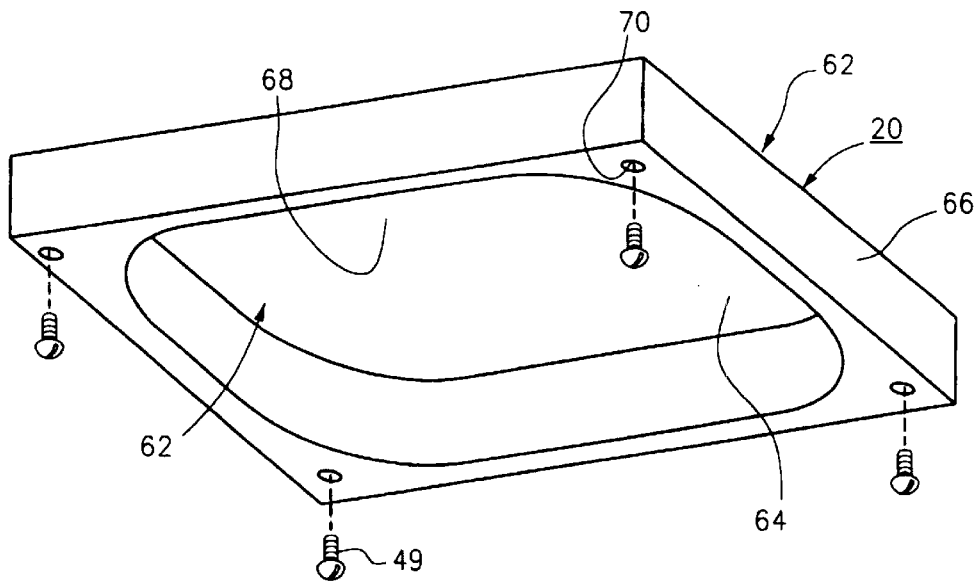
FIG. 7 is a bottom perspective view of a cover having features of the present invention.

The size and shape of each cover 62 can be varied to accommodate the design of each coil 18. FIG. 7 illustrates a perspective view of an individual cover 62. In this embodiment, the cover 62 is shaped similar to a square box without a lid. In particular, each cover 62 includes a first section 64 and a second section 66. For the embodiment illustrated, the first section 64 is substantially flat, plate shaped and the second section 66 is rectangular tube shaped. The second section 66 extends downward from the periphery of the first section 64. The cover 62 is open-ended opposite the first section 64.

The first section 64 and the second section 66 cooperate to form a cover cavity 68 which is sized and shaped to receive, encircle, and fit over one coil 18 and the coil support 22. In the embodiment illustrated in FIG. 7, the cover cavity 68 is shaped similar to a flat, rectangle. Preferably, the cover cavity 68 is sized and shaped to provide a portion of the fluid passageway 58 between each cover 62 and each coil 18 for injecting the fluid 24 to cool each individual coil 18. With this design, the temperature of each coil 18 can be individually monitored and controlled by controlling the flow of the fluid 24 into the fluid passageway 58.

Each cover 62 is individually secured to the coil base 16 over one coil 18 and one coil support 22. In the embodiment illustrated in the Figures, each cover 62 is secured to the coil base 16 with the cover fasteners 49. More specifically, each cover 62, includes four, spaced apart, corner holes 70 positioned at the corners of the second section 66. Each corner hole 70 is sized, shaped, and internally threaded to engage one of the cover fasteners 49. Alternately, for example, each cover 62 can be secured to the coil base 16 with an adhesive (not shown).

Each cover 62 of the present invention is preferably made of low or non-electrically conductive, non-magnetic material, such as low electrical conductivity stainless steel or titanium, or non-electrically conductive plastic or ceramic. Each cover 62 is preferably manufactured as a single unitary piece.

Referring back to FIG. 2, each fluid passageway 58 preferably surrounds substantially the entire coil 18. The fluid passageway 58 illustrated in FIG. 2 extends between the first surface 23 of the coil base 16 and the second side 34 of the coil 18, between the second section 66 of the cover 62 and the outer perimeter 36 of coil 18, and the first section 64 of the cover 62 and the first side 32 of the coil 18. Preferably, the fluid passageway 58 provides an approximately 1 mm–4 mm gap between the coil 18 and the cover 62 and/or the first surface 23 of the coil base 16.

One or more inlet(s) 72 and one or more outlets 74 extend into each fluid passageway 58 so that the fluid 24 can be delivered to each fluid passageway 58 to cool each coil 18. Importantly, the location of the inlet(s) 72 and outlet(s) 74 can affect the cooling of the coils 18. In the embodiment illustrated in FIG. 2, each fluid passageway 58 includes a pair of inlets 72 and a single outlet 74. More specifically, in this embodiment, each inlet 72 is one of the fluid apertures 48 which extends through the base body 43 near one of the coil supports 22, while the outlet 74 is the fluid aperture 48 which extends through the coil support 22. Referring specifically to FIG. 2, with this design, the fluid 24 flows in through the fluid apertures 48 by the coil support 22, around the coil 18 and out the fluid aperture 48 in the coil support 22. Alternately, for example, the flow of fluid 24 could be reversed.

One or more fluid sources 75 can be used to force or direct the fluid 24 through the fluid passageways 58 to cool the coils 18. The design of the fluid source 75 can be varied to suit the cooling requirements of the coils 18. In the embodiment illustrated in FIG. 1, a single fluid source 75 is used to cool a single coil 18. The fluid source 75 illustrated in FIG. 1 includes (i) a reservoir 76 for receiving the fluid 24, (ii) a heat exchanger 77, i.e. a chiller unit, for cooling the fluid 24, (iv) an outlet pipe 78 which connects the outlet 74 to the heat exchanger 77, (v) a fluid pump 79, and (vi) an inlet pipe 81 for transferring the fluid 24 from the fluid pump 79 to each inlet 72. Alternately, the fluid source 75 could be designed to cool more than one coil 18.

The temperature, flow rate, and type of the fluid 24 is selected and controlled to precisely control the temperature of the coil assembly 14. For the embodiments illustrated, the fluid temperature is maintained between approximately 20 and 25° C., the flow rate is between approximately one and five liters per minute. A suitable fluid 24 is Flourinert type FC-77, made by 3M Company in Minneapolis, Minnesota. Preferably, the rate of flow of the fluid 24 and the temperature of fluid 24 is controlled to maintain the external surface 25 of the coil assembly 14 at a predetermined temperature. By controlling the temperature of the external surface 25 of the coil assembly 14, heat transfer from the coil assembly 14 to the surrounding environment can be reduced or eliminated.

Figure 8:
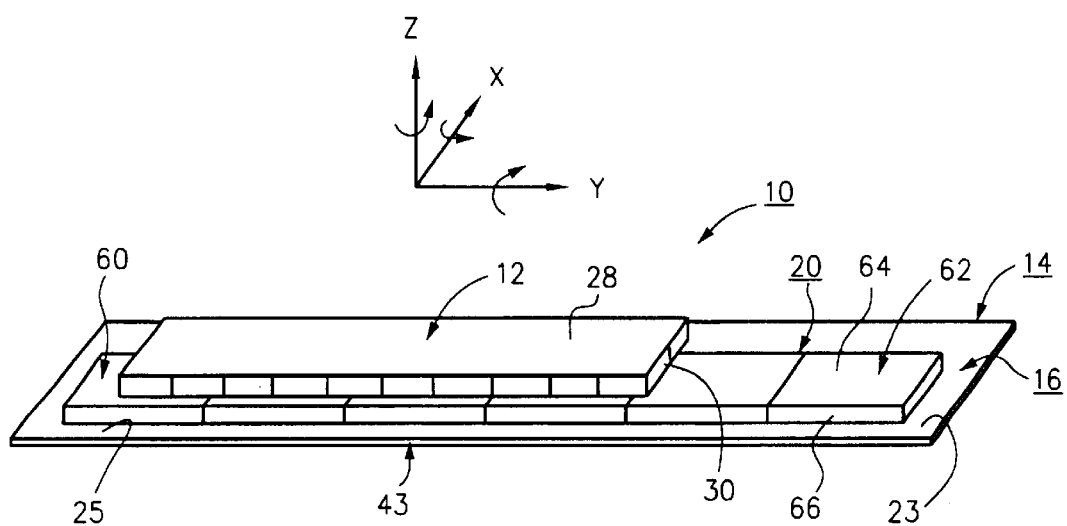
FIG. 8 is a perspective view of another electric motor having features of the present invention.

The present invention can be used with other types of motors. For example, FIG. 8 illustrates a perspective view of a linear motor 10 having features of the present invention. The linear motor 10 illustrated is movable along only the Y axis. In this embodiment, the magnet assembly 12 is again spaced apart from the coil assembly 14 with an air bearing (not shown) or other appropriate means. The coil assembly 14 is somewhat similar to the coil assembly 14 for the motor 10 illustrated in FIG. 1. However, the coil assembly 14 in FIG. 8 includes a single line of six coils (not shown in FIG. 8) arranged in a linear pattern. In this embodiment, the coils 18, the coil supports 22 and covers 62 can be similar to those discussed above.

Figure 9:
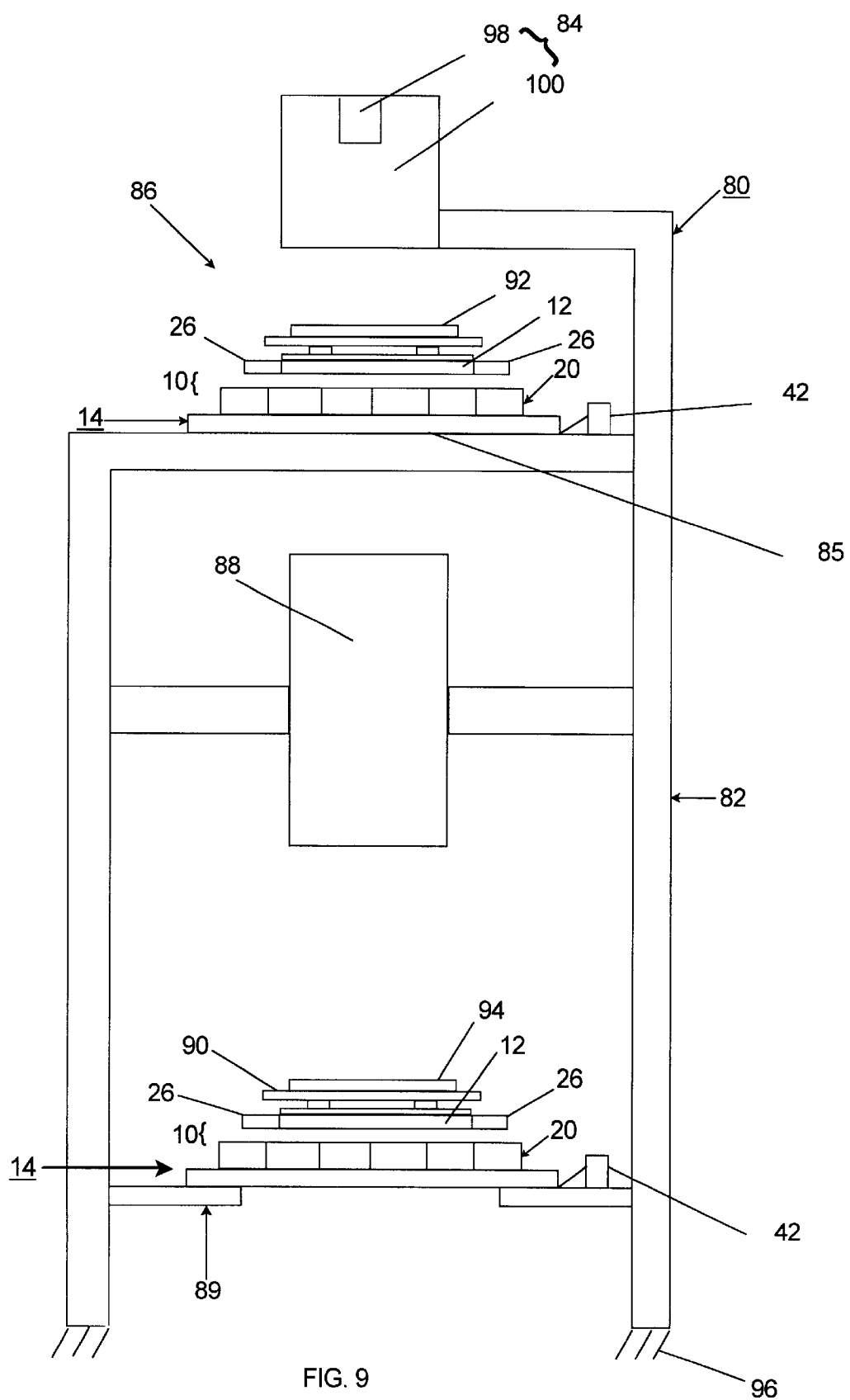
FIG. 9 is a schematic illustration of an exposure apparatus having features of the present invention.

FIG. 9 is a schematic view illustrating an exposure apparatus 80 useful with the present invention. The exposure apparatus 80 includes an apparatus frame 82, an illumination system 84 (irradiation apparatus), a first stage base 85, a first stage 86, a lens assembly 88, a second stage base 89, and a second stage 90. One or more of the motors 10 provided herein can be used to move and position one or both of the stages 86, 90. The exposure apparatus 80 is particularly useful for transferring an image from a first object 92, e.g. a reticle onto a second object 94, e.g. a semiconductor wafer. The exposure apparatus 80 mounts to a base 96, i.e., a floor or the ground or some other supporting structure.

The apparatus frame 82 is rigid and supports the components of the exposure apparatus 80. The design of the apparatus frame 82 can be varied to suit the design requirements for the rest of the exposure apparatus 80. The apparatus frame 82 illustrated in FIG. 9, supports the first stage base 85, the second stage base 89, the lens assembly 88, and the illumination system 84 above the base 96. Alternately, for example, separate, individual structures (not shown) can be used to support the stage bases 85, 89, the illumination system 84 and the lens assembly 88 above the base 96.

The illumination system 84 includes an illumination source 98 and an illumination optical assembly 100. The illumination source 98 emits the beam (irradiation) of light energy. The illumination optical assembly 100 guides the beam of light energy from the illumination source 98 to the lens assembly 88. The beam illuminates selectively different portions of the reticle and exposes the wafer. In FIG. 9, the illumination source 98 is illustrated as being supported above the first stage 86. Typically, however, the illumination source 98 is secured to one of the sides of the apparatus frame 82 and the energy beam from the illumination source 98 is directed to above the first stage 86 with the illumination optical assembly 100.

The lens assembly 88 projects and/or focuses the light passing through first object 92 to the second object 94. Depending upon the design of the apparatus 80, the lens assembly 88 can magnify or reduce the image illuminated on the first object 92.

The first stage 86 holds and precisely positions the first object 92 relative to the lens assembly 88 and the second object 94. In the embodiment illustrated in FIG. 9, a motor 10 having features of the present invention is used to move the first stage 86 relative to the first stage base 85 and the lens assembly 88. In this embodiment, the magnet assembly 12 is retained adjacent to the coil assembly 14 with the vacuum pre-load type air bearing 26. Alternately, the magnet assembly 12 can be held by other ways, such as guides (not shown) or by magnetic levitation forces. Depending upon the design of the apparatus 80, multiple servo drive units, linear motors and/or planar motors can also be used to move the first stage 86 relative to the first stage base 85.

The second stage 90 holds and positions the second object 94 with respect to the projected image of the illuminated portions of the first object 92. In the embodiment illustrated in FIG. 9, the second stage 90 is supported and positioned by a planar motor 10 having features of the present invention. The planar motor 10 includes a moving magnet assembly 12 and a fixed coil assembly 14 having a plurality of coils 18 (not shown in FIG. 9). In this embodiment, the magnet assembly 12 is positioned adjacent to the coil assembly 14 with a vacuum pre-load type air bearing 26. Alternatively, the magnet assembly 12 can be held by other ways, such as guides (not shown) or by magnet levitation forces. Depending upon the design, the apparatus 80 can also include multiple servo drive units, linear motors and planar motors to move the second stage 90 relative to the second stage base 89.

The exposure apparatus 80 is particularly useful as a lithographic device that transfers a pattern (not shown) of an integrated circuit from the first object 92, i.e., a reticle onto the second object 94, i.e., a semiconductor wafer. There are a number of different types of lithographic devices. For example, the exposure apparatus 80 can be used a scanning type photolithography system which exposes the pattern from the reticle 92 onto the wafer 94. In a scanning type photolithography system, the reticle 92 is moved perpendicular to an optical axis of the lens assembly 88 by the first stage 86 and the wafer 94 is moved perpendicular to an optical axis of the lens assembly 88 by the second stage 90. Scanning of the reticle 92 onto the wafer 94 occurs while the reticle 92 and the wafer 94 are moving synchronously.

Alternately, the exposure apparatus 80 can be a step-and-repeat type photolithography system that exposes the reticle 92 while the reticle 92 and the wafer 94 are stationary. In the step and repeat process, the wafer 94 is in a constant position relative to the reticle 92 and the lens assembly 88 during the exposure of an individual field. Subsequently, between consecutive exposure steps, the wafer 94 is consecutively moved by the second stage 90 so that the next field of the semiconductor wafer 94 is brought into position relative to the lens assembly 88 and the reticle 92. Following this process, the images on the reticle 92 are sequentially exposed onto the fields of the wafer 94.

However, the use of the exposure apparatus 80 provided herein is not limited to a photolithography system for semiconductor manufacturing. The exposure apparatus 80, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a lens assembly.

Additionally, the electric motor 10 provided herein can be used in other devices, including semi-conductor processing equipment, elevators, electric razors, machine tools, metal cutting machines, inspection machines, and disk drives.

The illumination source 98 can be g-line (436 nm), i-line (365 nm), KrF excimer laser (248 nm), ArF excimer laser (193 nm) and $F_2$ laser (157 nm). Alternately, the illumination source 98 can also use charged particle beams such as x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

In terms of the magnification of the lens assembly 88 included in the photolithography system, the lens assembly 88 need not be limited to a reduction system. It could also be a 1× or magnification system.

With respect to a lens assembly 88, when far ultra-violet rays such as the excimer laser is used, glass materials such as quartz and fluorite that transmit far ultra-violet rays is preferable to be used. When the $F_2$ type laser or x-ray is used, the lens assembly 88 should preferably be either catadioptric or refractive (a reticle should also preferably be a reflective type), and when an electron beam is used, electron optics should preferably consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No.8-171054 published in the Official Gazette for Laid-Open Patent Applications and its counterpart U.S. Pat. No. 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No.8-334695 published in the Official Gazette for Laid-Open Patent Applications and its counterpart U.S. Pat. No. 5,689,377 as well as Japan Patent Application Disclosure No.10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures in U.S. Pat. Nos. 5,623,853 and 5,528,118 are incorporated herein by reference.

Alternatively, one of the stages could be driven by a planar motor, which drives the stage by electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,118 and 5,874,820 and Japanese Patent Application Disclosure No. 8-330224 are incorporated herein by reference.

As described above, a photolithography system according to the above described embodiments can be built by assembling various subsystems, including each element listed in the appended claims, in such a manner that prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, total adjustment is performed to make sure that every accuracy is maintained in the complete photolithography system. Additionally, it is desirable to manufacture an exposure system in a clean room where the temperature and cleanliness are controlled.

Figure 10:
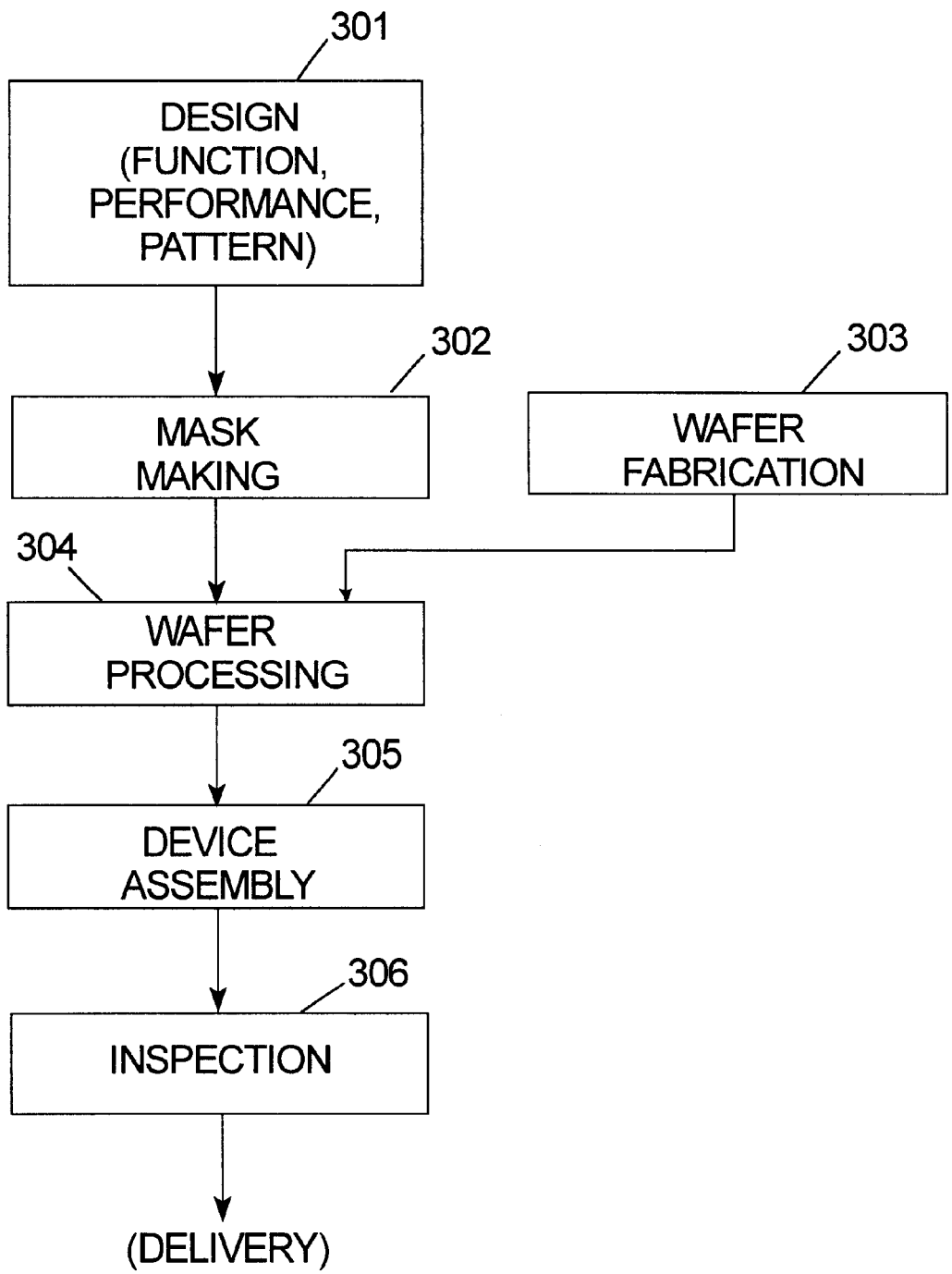
FIG. 10 is a flow chart that outlines a process for manufacturing a device in accordance with the present invention.

Further, semiconductor devices can be fabricated using the above described systems, by the process shown generally in FIG. 10. In step 301 the device's function and performance characteristics are designed. Next, in step 302, a mask (reticle) having a pattern is designed according to the previous designing step, and in a parallel step 303 a wafer is made from a silicon material. The mask pattern designed in step 302 is exposed onto the wafer from step 303 in step 304 by a photolithography system described hereinabove in accordance with the present invention. In step 305 the semiconductor device is assembled (including the dicing process, bonding process and packaging process), then finally the device is inspected in step 306.

Figure 11:
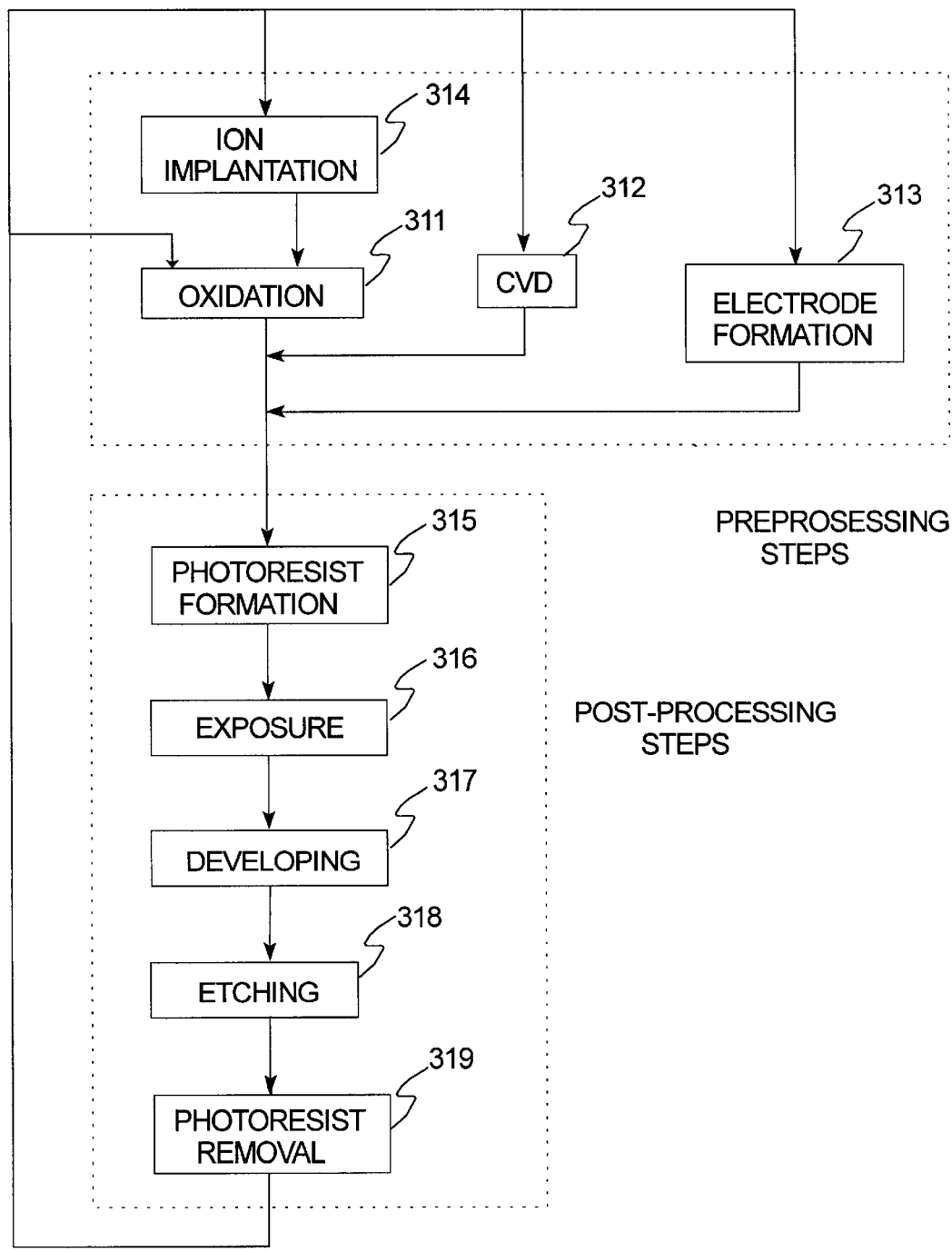
FIG. 11 is a flow chart that outlines device processing in more detail.

FIG. 11 illustrates a detailed flowchart example of the above-mentioned step 304 in the case of fabricating semiconductor devices. In FIG. 11, in step 311 (oxidation step), the wafer surface is oxidized. In step 312 (CVD step), an insulation film is formed on the wafer surface. In step 313 (electrode formation step), electrodes are formed on the wafer by vapor deposition. In step 314 (ion implantation step), ions are implanted in the wafer. The above mentioned steps 311–314 form the preprocessing steps for wafers during wafer processing, and selection is made at each step according to processing requirements.

At each stage of wafer processing, when the above-mentioned preprocessing steps have been completed, the following post-processing steps are implemented. During post-processing, firstly, in step 315 (photoresist formation step), photoresist is applied to a wafer. Next, in step 316, (exposure step), the above-mentioned exposure device is used to transfer the circuit pattern of a mask (reticle) to a wafer. Then, in step 317 (developing step), the exposed wafer is developed, and in step 318 (etching step), parts other than residual photoresist (exposed material surface) are removed by etching. In step 319 (photoresist removal step), unnecessary photoresist remaining after etching is removed.

Multiple circuit patterns are formed by repetition of these preprocessing and post-processing steps.

While the particular coil assembly 14 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A coil assembly for use with an electric motor, the coil assembly comprising:
    a coil base;
    a first coil;
    a first cover that cooperates with the coil base to encircle the first coil; and
    a first coil support that secures the first coil to the coil base, the first coil support cantilevering away from the coil base towards the first cover and being spaced apart from the first cover.

2. The coil assembly of claim 1 further comprising a second coil and a second cover that cooperates with the coil base to encircle the second coil; wherein the first cover cooperates with the coil base to provide a first fluid passageway around the first coil and the second cover cooperates with the coil base to provide a second fluid passageway around the second coil.

3. The coil assembly of claim 1 wherein the first coil support engages the first coil approximately at an inner perimeter of the first coil.

4. The coil assembly of claim 1 wherein the first coil support includes a fluid aperture that extends through a portion of the first coil support and allows for the flow of a fluid through the first coil support.

5. An electric motor including a magnet assembly and the coil assembly of claim 1.

6. The electric motor of claim 5 including a fluid source that directs fluid around the first coil to maintain an external surface of the coil assembly at a predetermined temperature.

7. An exposure apparatus including a first stage, a second stage and the motor of claim 5 coupled to one of the stages, the electric motor being adapted to move one of the stages relative to the other one of the stages.

8. An object on which an image has been formed by the exposure apparatus of claim 7.

9. A coil assembly for use with an electric motor, the coil assembly comprising:
    a coil base;
    a first coil;
    a first cover that cooperates with the coil base to encircle the first coil; and
    a first coil support that secures the first coil to the coil base, the first coil support including a fluid aperture that extends through a portion of the first coil support and allows for the flow of a fluid through the first coil support.

10. The coil assembly of claim 9 further comprising a second coil and a second cover that cooperates with the coil base to encircle the second coil; wherein the first cover cooperates with the coil base to provide a first fluid passageway around the first coil and the second cover cooperates with the coil base to provide a second fluid passageway around the second coil.

11. The coil assembly of claim 9 wherein the first coil support engages the first coil approximately at an inner perimeter of the first coil.

12. The coil assembly of claim 9 wherein the first coil support cantilevers away from the coil base towards the first cover and is spaced apart from the first cover.

13. An electric motor including a magnet assembly and the coil assembly of claim 9.

14. The electric motor of claim 13 including a fluid source that directs fluid around the first coil to maintain an external surface of the coil assembly at a predetermined temperature.

15. An exposure apparatus including a first stage, a second stage and the motor of claim 13 coupled to one of the stages, the electric motor being adapted to move one of the stages relative to the other one of the stages.

16. An object on which an image has been formed by the exposure apparatus of claim 15.

17. A method for manufacturing a coil assembly for an electric motor, the method comprising the steps of:
    providing a coil base;
    providing a first coil;
    encircling the first coil with a first cover; and
    securing the first coil to the coil base with a first coil support, the first coil support cantilevering away from the coil base towards the first cover, the first coil support being spaced apart from the first cover.

18. The method of claim 17 further comprising the steps of providing a second coil, and encircling the second coil with a second cover; wherein the first cover cooperates with the coil base to provide a first fluid passageway around the first coil and the second cover cooperates with the coil base to provide a second fluid passageway around the second coil.

19. The method of claim 18 including the step of directing a fluid through a first inlet into the first fluid passageway and the step of directing a fluid through a second inlet into the second fluid passageway.

20. The method of claim 17 including the step of directing a fluid through a fluid aperture in the first coil support.

21. A method for making an electric motor using an electromagnetic force, the method comprising the steps of:

providing a magnet assembly; and disposing a coil assembly manufactured by the method of claim 17 near the magnet assembly.

22. The method of claim 21 including the step of directing a fluid around the first coil to maintain an external surface of the coil assembly at a predetermined temperature.

23. A method of making an exposure apparatus, the method comprising the steps of:

providing a stage; and connecting a motor manufactured by the method of claim 21 to the stage for moving the stage.

24. A method of making a device utilizing the exposure apparatus made by the method of claim 23.

25. A method for manufacturing a coil assembly for an electric motor, the method comprising the steps of:

providing a coil base;

providing a first coil;

encircling the first coil with a first cover;

securing the first coil to the coil base with a first coil support; and directing a fluid through a fluid aperture in the first coil support.

26. The method of claim 25 further comprising the steps of providing a second coil, and encircling the second coil with a second cover; wherein the first cover cooperates with the coil base to provide a first fluid passageway around the first coil and the second cover cooperates with the coil base to provide a second fluid passageway around the second coil.

27. The method of claim 26 including the step of directing a fluid through a first inlet into the first fluid passageway and the step of directing a fluid through a second inlet into the second fluid passageway.

28. The method of claim 25 wherein the step of securing the first coil includes cantilevering the first coil support away from the coil base towards the first cover, the first coil support being spaced apart from the first cover.

29. A method for making an electric motor using an electromagnetic force, the method comprising the steps of:

providing a magnet assembly; and disposing a coil assembly manufactured by the method of claim 25 near the magnet assembly.

30. The method of claim 29 including the step of directing a fluid around the first coil to maintain an external surface of the coil assembly at a predetermined temperature.

31. A method of making an exposure apparatus, the method comprising the steps of:

providing a stage; and connecting a motor manufactured by the method of claim 25 to the stage for moving the stage.

32. A method of making a device utilizing the exposure apparatus made by the method of claim 31.

* * * * *